United States Patent
Lu et al.

(10) Patent No.: US 9,021,339 B2
(45) Date of Patent: Apr. 28, 2015

(54) DATA RELIABILITY SCHEMES FOR DATA STORAGE SYSTEMS

(71) Applicant: Western Digital Technologies, Inc., Irvine, CA (US)

(72) Inventors: Guangming Lu, Irvine, CA (US); Leader Ho, Irvine, CA (US); Radoslav Danilak, Cupertino, CA (US); Rodney N. Mullendore, San Jose, CA (US); Justin Jones, Burlingame, CA (US); Andrew J. Tomlin, San Jose, CA (US)

(73) Assignees: Western Digital Technologies, Inc., Irvine, CA (US); Skyera, Inc., San Jose, CA (US)

( * ) Notice: Subject to any disclaimer, the term of this patent is extended or adjusted under 35 U.S.C. 154(b) by 148 days.

(21) Appl. No.: 13/689,673

(22) Filed: Nov. 29, 2012

(65) Prior Publication Data
US 2014/0149826 A1    May 29, 2014

(51) Int. Cl.
*G11C 29/00* (2006.01)
*G06F 11/10* (2006.01)

(52) U.S. Cl.
CPC .................................. *G06F 11/108* (2013.01)

(58) Field of Classification Search
CPC .. G06F 11/108; G06F 11/1076; G06F 3/0688
USPC .................. 714/770, 773; 711/114
See application file for complete search history.

(56) References Cited

U.S. PATENT DOCUMENTS

| | | | |
|---|---|---|---|
| 5,621,660 A | 4/1997 | Chaddha et al. | |
| 5,768,535 A | 6/1998 | Chaddha et al. | |
| 6,011,868 A | 1/2000 | van den Branden et al. | |
| 6,289,471 B1 | 9/2001 | Gordon | |
| 6,856,556 B1 | 2/2005 | Hajeck | |
| 6,895,547 B2 | 5/2005 | Eleftheriou et al. | |
| 6,934,904 B2 | 8/2005 | Talagala et al. | |
| 7,072,417 B1 | 7/2006 | Burd et al. | |
| 7,126,857 B2 | 10/2006 | Hajeck | |
| 7,129,862 B1 | 10/2006 | Shirdhonkar et al. | |
| 7,149,846 B2 | 12/2006 | Hetrick | |

(Continued)

FOREIGN PATENT DOCUMENTS

JP    2008102819 A    10/2006
KR    1020100076447    8/2011

(Continued)

OTHER PUBLICATIONS

International Search Report and Written Opinion dated Jan. 23, 2014 from PCT/US2013/062760, filed Sep. 30, 2013, 10 pages.

(Continued)

*Primary Examiner* — Sam Rizk

(57) ABSTRACT

A data storage system configured to implement a data reliability scheme is disclosed. In one embodiment, a data storage system controller detects uncorrectable errors using intra page parity when data units are read from a set of pages. When an uncorrectable error is detected, the data storage system controller attempts to recover user data using inter page parity without using all data from each page of the set of pages. Recovery of user data can thereby be performed without reading all data from each page. As a result, the amount of time needed to read data can be reduced in some cases and overall data storage system performance can be increased.

22 Claims, 6 Drawing Sheets

(56) References Cited

U.S. PATENT DOCUMENTS

| | | |
|---|---|---|
| 7,263,651 B2 | 8/2007 | Xia et al. |
| 7,346,832 B2 | 3/2008 | Richardson et al. |
| 7,395,490 B2 | 7/2008 | Richardson et al. |
| 7,409,492 B2 | 8/2008 | Tanaka et al. |
| 7,430,136 B2 | 9/2008 | Merry, Jr. et al. |
| 7,447,807 B1 | 11/2008 | Merry et al. |
| 7,500,172 B2 | 3/2009 | Shen et al. |
| 7,502,256 B2 | 3/2009 | Merry, Jr. et al. |
| 7,509,441 B1 | 3/2009 | Merry et al. |
| 7,596,643 B2 | 9/2009 | Merry, Jr. et al. |
| 7,653,778 B2 | 1/2010 | Merry, Jr. et al. |
| 7,657,816 B2 | 2/2010 | Cohen et al. |
| 7,685,337 B2 | 3/2010 | Merry, Jr. et al. |
| 7,685,338 B2 | 3/2010 | Merry, Jr. et al. |
| 7,685,374 B2 | 3/2010 | Diggs et al. |
| 7,733,712 B1 | 6/2010 | Walston et al. |
| 7,739,576 B2 | 6/2010 | Radke |
| 7,765,373 B1 | 7/2010 | Merry et al. |
| 7,797,611 B2 | 9/2010 | Dholakia et al. |
| 7,809,994 B2 | 10/2010 | Gorobets |
| 7,814,393 B2 | 10/2010 | Kyung et al. |
| 7,898,855 B2 | 3/2011 | Merry, Jr. et al. |
| 7,912,991 B1 | 3/2011 | Merry et al. |
| 7,913,149 B2 | 3/2011 | Gribok et al. |
| 7,936,603 B2 | 5/2011 | Merry, Jr. et al. |
| 7,962,792 B2 | 6/2011 | Diggs et al. |
| 8,078,918 B2 | 12/2011 | Diggs et al. |
| 8,090,899 B1 | 1/2012 | Syu |
| 8,095,851 B2 | 1/2012 | Diggs et al. |
| 8,108,692 B1 | 1/2012 | Merry et al. |
| 8,122,185 B2 | 2/2012 | Merry, Jr. et al. |
| 8,127,048 B1 | 2/2012 | Merry et al. |
| 8,135,903 B1 | 3/2012 | Kan |
| 8,151,020 B2 | 4/2012 | Merry, Jr. et al. |
| 8,161,227 B1 | 4/2012 | Diggs et al. |
| 8,161,345 B2 | 4/2012 | Graef |
| 8,166,245 B2 | 4/2012 | Diggs et al. |
| 8,176,284 B2 | 5/2012 | Frost et al. |
| 8,176,360 B2 | 5/2012 | Frost et al. |
| 8,179,292 B2 | 5/2012 | Nakagawa |
| 8,181,089 B1 | 5/2012 | Fernandes et al. |
| 8,243,525 B1 | 8/2012 | Kan |
| 8,254,172 B1 | 8/2012 | Kan |
| 8,261,012 B2 | 9/2012 | Kan |
| 8,296,625 B2 | 10/2012 | Diggs et al. |
| 8,312,207 B2 | 11/2012 | Merry, Jr. et al. |
| 8,316,176 B1 | 11/2012 | Phan et al. |
| 8,339,919 B1 | 12/2012 | Lee |
| 8,341,339 B1 | 12/2012 | Boyle et al. |
| 8,375,151 B1 | 2/2013 | Kan |
| 8,392,635 B2 | 3/2013 | Booth et al. |
| 8,397,107 B1 | 3/2013 | Syu et al. |
| 8,407,449 B1 | 3/2013 | Colon et al. |
| 8,423,722 B1 | 4/2013 | Deforest et al. |
| 8,433,858 B1 | 4/2013 | Diggs et al. |
| 8,443,167 B1 | 5/2013 | Fallone et al. |
| 8,447,920 B1 | 5/2013 | Syu |
| 8,458,435 B1 | 6/2013 | Rainey, III et al. |
| 8,478,930 B1 | 7/2013 | Syu |
| 8,489,854 B1 | 7/2013 | Colon et al. |
| 8,503,237 B1 | 8/2013 | Horn |
| 8,521,972 B1 | 8/2013 | Boyle et al. |
| 8,549,236 B2 | 10/2013 | Diggs et al. |
| 8,583,835 B1 | 11/2013 | Kan |
| 8,601,311 B2 | 12/2013 | Horn |
| 8,601,313 B1 | 12/2013 | Horn |
| 8,612,669 B1 | 12/2013 | Syu et al. |
| 8,612,804 B1 | 12/2013 | Kang et al. |
| 8,615,681 B2 | 12/2013 | Horn |
| 8,638,602 B1 | 1/2014 | Horn |
| 8,639,872 B1 | 1/2014 | Boyle et al. |
| 8,683,113 B2 | 3/2014 | Abasto et al. |
| 8,700,834 B2 | 4/2014 | Horn et al. |
| 8,700,950 B1 | 4/2014 | Syu |
| 8,700,951 B1 | 4/2014 | Call et al. |
| 8,706,985 B1 | 4/2014 | Boyle et al. |
| 8,707,104 B1 | 4/2014 | Jean |
| 8,713,066 B1 | 4/2014 | Lo et al. |
| 8,713,357 B1 | 4/2014 | Jean et al. |
| 8,719,531 B2 | 5/2014 | Strange et al. |
| 8,724,422 B1 | 5/2014 | Agness et al. |
| 8,725,931 B1 | 5/2014 | Kang |
| 8,745,277 B2 | 6/2014 | Kan |
| 8,751,728 B1 | 6/2014 | Syu et al. |
| 8,769,190 B1 | 7/2014 | Syu et al. |
| 8,769,232 B2 | 7/2014 | Suryabudi et al. |
| 8,775,720 B1 | 7/2014 | Meyer et al. |
| 8,782,327 B1 | 7/2014 | Kang et al. |
| 8,788,778 B1 | 7/2014 | Boyle |
| 8,788,779 B1 | 7/2014 | Horn |
| 8,788,880 B1 | 7/2014 | Gosla et al. |
| 8,793,429 B1 | 7/2014 | Call et al. |
| 2003/0037298 A1 | 2/2003 | Eleftheriou et al. |
| 2004/0098659 A1 | 5/2004 | Bjerke et al. |
| 2005/0204253 A1 | 9/2005 | Sukhobok et al. |
| 2005/0216821 A1 | 9/2005 | Harada |
| 2005/0246617 A1 | 11/2005 | Kyung et al. |
| 2006/0036925 A1 | 2/2006 | Kyung et al. |
| 2006/0036933 A1 | 2/2006 | Blankenship et al. |
| 2006/0085593 A1 | 4/2006 | Lubbers et al. |
| 2007/0124648 A1 | 5/2007 | Dholakia et al. |
| 2008/0141054 A1 | 6/2008 | Danilak |
| 2008/0155160 A1 | 6/2008 | McDaniel |
| 2008/0168304 A1 | 7/2008 | Flynn et al. |
| 2008/0195900 A1 | 8/2008 | Chang et al. |
| 2008/0244353 A1 | 10/2008 | Dholakia et al. |
| 2008/0282128 A1 | 11/2008 | Lee et al. |
| 2008/0301521 A1 | 12/2008 | Gunnam et al. |
| 2008/0316819 A1 | 12/2008 | Lee |
| 2009/0070652 A1 | 3/2009 | Myung et al. |
| 2009/0193184 A1 | 7/2009 | Yu et al. |
| 2009/0240873 A1 | 9/2009 | Yu et al. |
| 2009/0241008 A1 | 9/2009 | Kim et al. |
| 2009/0241009 A1 | 9/2009 | Kong et al. |
| 2009/0249159 A1 | 10/2009 | Lee et al. |
| 2009/0259805 A1 | 10/2009 | Kilzer et al. |
| 2010/0017650 A1 | 1/2010 | Chin et al. |
| 2010/0020611 A1* | 1/2010 | Park ......................... 365/185.09 |
| 2010/0049914 A1 | 2/2010 | Goodwin |
| 2010/0083071 A1 | 4/2010 | Shen et al. |
| 2010/0100788 A1 | 4/2010 | Yang et al. |
| 2010/0107030 A1 | 4/2010 | Graef |
| 2010/0125695 A1 | 5/2010 | Wu et al. |
| 2010/0131819 A1 | 5/2010 | Graef |
| 2010/0174849 A1 | 7/2010 | Walston et al. |
| 2010/0250793 A1 | 9/2010 | Syu |
| 2010/0268985 A1 | 10/2010 | Larsen et al. |
| 2010/0275088 A1 | 10/2010 | Graef |
| 2010/0315874 A1 | 12/2010 | Ghodsi |
| 2011/0066793 A1 | 3/2011 | Burd |
| 2011/0099323 A1 | 4/2011 | Syu |
| 2011/0126078 A1 | 5/2011 | Ueng et al. |
| 2011/0179333 A1 | 7/2011 | Wesel et al. |
| 2011/0191649 A1 | 8/2011 | Lim et al. |
| 2011/0213919 A1 | 9/2011 | Frost et al. |
| 2011/0214037 A1 | 9/2011 | Okamura et al. |
| 2011/0231737 A1 | 9/2011 | Dachiku |
| 2011/0231739 A1 | 9/2011 | Kim |
| 2011/0239088 A1 | 9/2011 | Post |
| 2011/0246862 A1 | 10/2011 | Graef |
| 2011/0252294 A1 | 10/2011 | Ng et al. |
| 2011/0283049 A1 | 11/2011 | Kang et al. |
| 2011/0296273 A1 | 12/2011 | Rub |
| 2011/0302477 A1 | 12/2011 | Goss et al. |
| 2012/0072654 A1 | 3/2012 | Olbrich et al. |
| 2012/0079189 A1* | 3/2012 | Colgrove et al. ............. 711/114 |
| 2012/0084506 A1 | 4/2012 | Colgrove et al. |
| 2012/0084507 A1 | 4/2012 | Colgrove et al. |
| 2012/0260020 A1 | 10/2012 | Suryabudi et al. |
| 2012/0272000 A1* | 10/2012 | Shalvi ......................... 711/114 |
| 2012/0278531 A1 | 11/2012 | Horn |
| 2012/0284460 A1 | 11/2012 | Guda |
| 2012/0324191 A1 | 12/2012 | Strange et al. |
| 2013/0054980 A1 | 2/2013 | Frost et al. |

(56) References Cited

U.S. PATENT DOCUMENTS

| | | |
|---|---|---|
| 2013/0132638 A1 | 5/2013 | Horn et al. |
| 2013/0145106 A1 | 6/2013 | Kan |
| 2013/0290793 A1 | 10/2013 | Booth et al. |
| 2014/0059405 A1 | 2/2014 | Syu et al. |
| 2014/0101369 A1 | 4/2014 | Tomlin et al. |
| 2014/0115427 A1 | 4/2014 | Lu |
| 2014/0133220 A1 | 5/2014 | Danilak et al. |
| 2014/0136753 A1 | 5/2014 | Tomlin et al. |
| 2014/0149826 A1 | 5/2014 | Lu et al. |
| 2014/0157078 A1 | 6/2014 | Danilak et al. |
| 2014/0181432 A1 | 6/2014 | Horn |
| 2014/0223255 A1 | 8/2014 | Lu et al. |

FOREIGN PATENT DOCUMENTS

| | | |
|---|---|---|
| KR | 100929371 | 11/2011 |
| WO | 2012058328 A1 | 5/2012 |
| WO | 2014065967 A1 | 5/2014 |
| WO | 2014084960 A1 | 6/2014 |
| WO | 2014088684 A1 | 6/2014 |

OTHER PUBLICATIONS

International Search Report and Written Opinion dated Jan. 23, 2014 from PCT/US2013/062760, International Filing Date: Sep. 30, 2013, Applicant: Western Digital Technologies, Inc., 10 pages.

Shayan S. Garani, U.S. Appl. No. 13/417,057, filed Mar. 9, 2012, 30 pages.

Guangming Lu, et. al. U.S. Appl. No. 13/718,289, filed Dec. 18, 2012, 27 pages.

Guangming Lu, et. al. U.S. Appl. No. 13/742,243, filed Jan. 15, 2013,(This application Claims Priority from U.S. Appl. No. 61/738,764, Dec. 18, 2012), 22 pages.

Shayan S. Garani, et. al., U.S. Appl. No. 13/725,965, filed Dec. 21, 2012, 31 pages.

Guangming Lu, et. al. U.S. Appl. No. 13/742,248, filed Jan. 15, 2013,(This application Claims Priority from U.S. Appl. No. 61/738,732, Dec. 18, 2012), 32 pages.

* cited by examiner

DATA RELIABILITY SCHEMES FOR DATA STORAGE SYSTEMS

BACKGROUND

1. Technical Field

This disclosure relates to data storage systems, such as solid state drives, for computer systems. More particularly, the disclosure relates to data reliability schemes for data storage systems.

2. Description of the Related Art

Many data storage components such as hard disks and solid state drives have certain advertised reliability guarantees that the manufacturers provide to customers. For example, certain solid state drive manufacturers guarantee a drive failure rate of $10^{-16}$ or $10^{-17}$. To increase data reliability, a data redundancy scheme such as RAID (Redundant Arrays of Independent Disks) is used to increase storage reliability. The redundancy may be provided by combining multiple storage elements within the storage device into groups and providing mirroring and/or error checking mechanisms. For example, various memory blocks of a solid state storage device may be combined into stripe groups in which user data is stored.

BRIEF DESCRIPTION OF THE DRAWINGS

Systems and methods that embody the various features of the invention will now be described with reference to the following drawings, in which.

DETAILED DESCRIPTION OF SPECIFIC EMBODIMENTS

Figure 1:
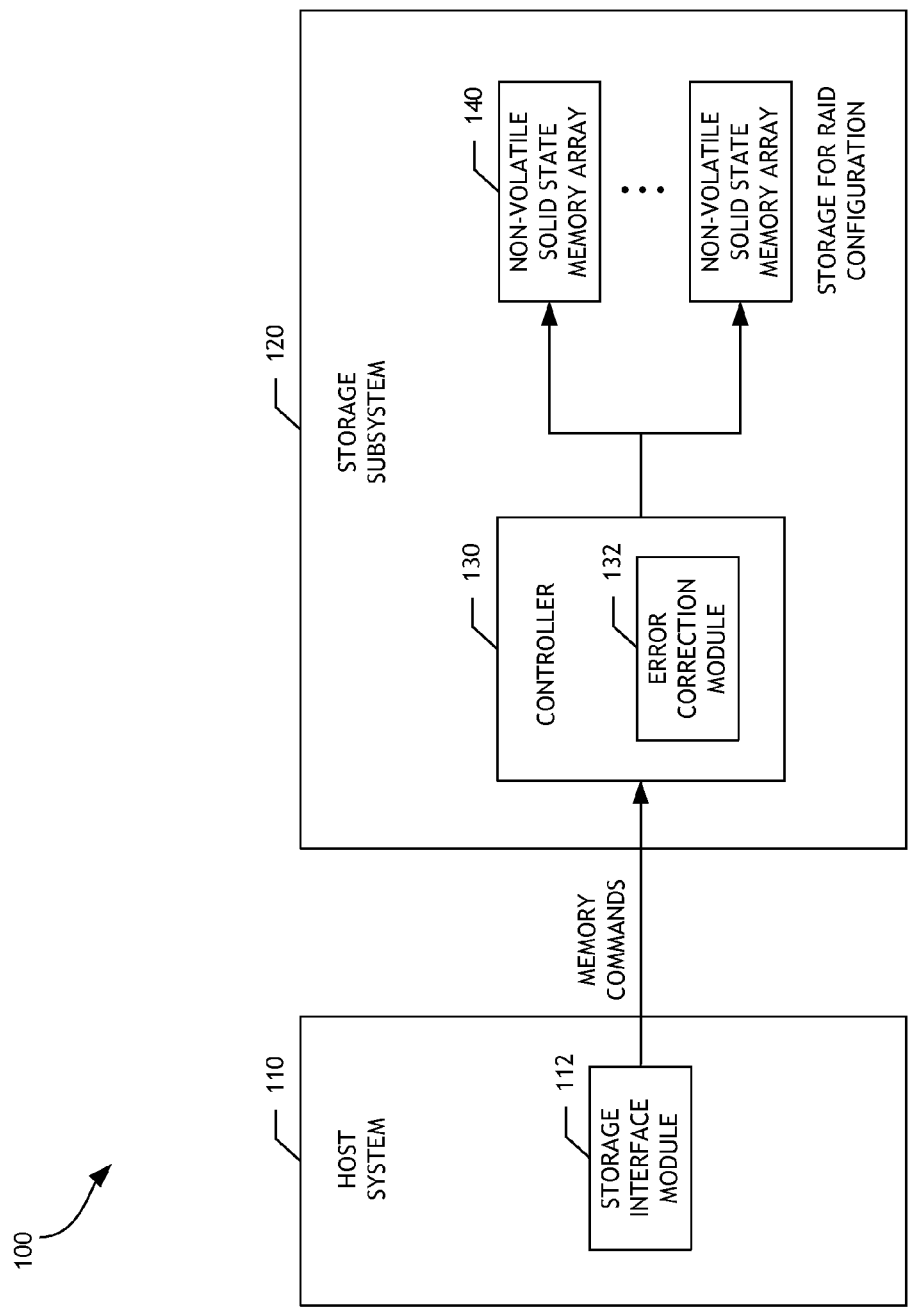
FIG. 1 illustrates a combination of a host system and a storage system that implements data reliability schemes according to one embodiment of the invention.

While certain embodiments are described, these embodiments are presented by way of example only, and are not intended to limit the scope of protection. Indeed, the novel methods and systems described herein may be embodied in a variety of other forms. Furthermore, various omissions, substitutions, and changes in the form of the methods and systems described herein may be made without departing from the scope of protection.

In some embodiments, "coding" or "to code" data as used in this disclosure refer to the process of encoding data and/or the process of decoding data. For example, encoding and/or decoding can be performed using error correcting codes. In some embodiments, a non-volatile solid state memory array, such as flash memory, can be divided into physical data units, such as blocks, pages, etc. In some embodiments, a flash memory page (F-page) can correspond to a smallest unit of flash memory that can be programmed in a single operation (e.g., atomically) or as a unit. In some embodiments, a block can include multiple pages, and a block can correspond to a smallest unit of flash memory that can be erased in a single operation (e.g., atomically) or as a unit. In some embodiments, a flash memory page can comprise multiple groupings of memory locations (e.g., E-pages).

Overview

Disclosed data reliability schemes can reduce an amount of time needed to process (e.g., read) data stored in a data storage system and perform data recovery when necessary. In some embodiments of the present invention, a controller is configured to implement an inter page parity (e.g., Reed-Solomon code in a RAID configuration) for data stored in a data storage system. The inter page parity includes parity data determined or generated for multiple F-pages (Flash pages) of user data. In one embodiment, among a set of F-pages, F-pages that are deemed more reliable (e.g., having a highest quality) for storing data can be selected for storing the inter page parity data while other F-pages can be used for storing user data. In addition, the controller can pad user data before processing so that coded data units have the same size for processing. The controller can further manage the inter page parity using a granularity matching a size of F-pages or a finer granularity, such as the granularity of E-pages (Error Correcting Code pages), where an F-Page includes multiple such smaller E-Pages. In some embodiments, when the inter page parity is managed using a finer granularity than F-page size, data can be recovered in the event of a memory failure without using all user and parity data from each F-page of a redundancy sequence.

In some embodiments of the present invention, a controller is configured to implement both intra and inter page parity for data stored in a data storage system. The intra and inter page parity can enable two levels of protection for stored data. For example, intra F-page page parity data (e.g. low-density parity-check code) provides an initial redundancy in the event of a detected error correcting code (ECC) error associated with reading or decoding data stored in an E-page. The intra F-page parity data can initially be used to attempt to correct the detected ECC error for the E-page, and to recover user data stored in the E-page. If the controller is unable to correct the detected ECC error, the controller may use inter F-page parity data to attempt perform data recovery for the E-page.

In some embodiments of the present invention, a controller is configured to exhaust multiple options for attempting to correct ECC errors before returning a data read error. For instance, the controller may perform rereads of the E-page using adjusted voltage threshold levels and re-decode the data from the E-page using adjusted decoding parameters. In addition, the controller may reread or re-decode other E-pages to attempt to successfully recover the data of the E-page when performing an inter page parity recovery for the E-page.

System Overview

FIG. 1 illustrates a combination 100 of a host system 110 and a storage system 120 that implements data reliability schemes according to one embodiment of the invention. As is shown, a storage system 120 (e.g., hybrid hard drive, solid state drive, etc.) includes a controller 130 and one or more non-volatile memory (NVM) arrays 140. The NVM arrays 140 can be included on a single die or multiple dies. The controller 130 includes an error correction module 132, which can implement and maintain one or more data redundancy schemes for the storage system 120. For example, the error correction module 132 can implement an inter page parity and an intra page parity for a set of F-pages that include E-pages. The inter and intra page parities can be maintained at an F-page and/or E-page granularity level. Further, the error correction module 132 can assign pages of NVM dies for use in storing user data or inter page parity data depending on a quality (e.g., reliability) of the dies for storing data. In addition, the error correction module 132 can perform a two-phase data recovery approach when uncorrectable intra page errors are detected. In a first phase, multiple intra page reread or re-decode attempts of a page of memory can be performed. If the first phase is unsuccessful in recovering stored data, in a second phase, an inter page recovery can be performed that may include intra page reread or re-decode attempts directed to other pages of memory.

The controller 130 can receive data and/or storage access commands from a storage interface module 112 (e.g., a device driver) of the host system 110. Storage access commands communicated by the storage interface module 112 can include write and read commands issued by the host system 110. The commands can specify a logical block address in the storage system 120, and the controller 130 can execute the received commands in the NVM arrays 140. In one embodiment, data may also be stored in one or more magnetic media storage modules (not shown in FIG. 1). In one embodiment, other types of storage modules can be included instead of or in addition to NVM arrays 140 and/or magnetic media storage modules.

The storage system 120 can store data received from the host system 110 so that the storage system 120 can act as memory storage for the host system 110. To facilitate this function, the controller 130 can implement a logical interface. The logical interface can present to the host system 110 storage system memory as a set of logical addresses (e.g., contiguous address) where data can be stored. Internally, the controller 130 can map logical addresses to various physical memory addresses in the one or more of the non-volatile memory arrays 140 and/or other memory module(s).

The one or more of the non-volatile memory arrays 140 can be implemented using NAND flash memory devices. Other types of solid-state memory devices can alternatively be used, such as array of flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NOR memory, EEPROM, Ferroelectric Memory (FeRAM), Magnetoresistive RAM (MRAM), other discrete NVM (non-volatile memory) chips, or any combination thereof. In one embodiment, non-volatile memory arrays 140 preferably include multi-level cell (MLC) devices having multi-level cells capable of storing more than a single bit of information, although single-level cell (SLC) memory devices or a combination of SLC and MLC devices may be used.

Inter Page Parity Schemes

Figure 2:
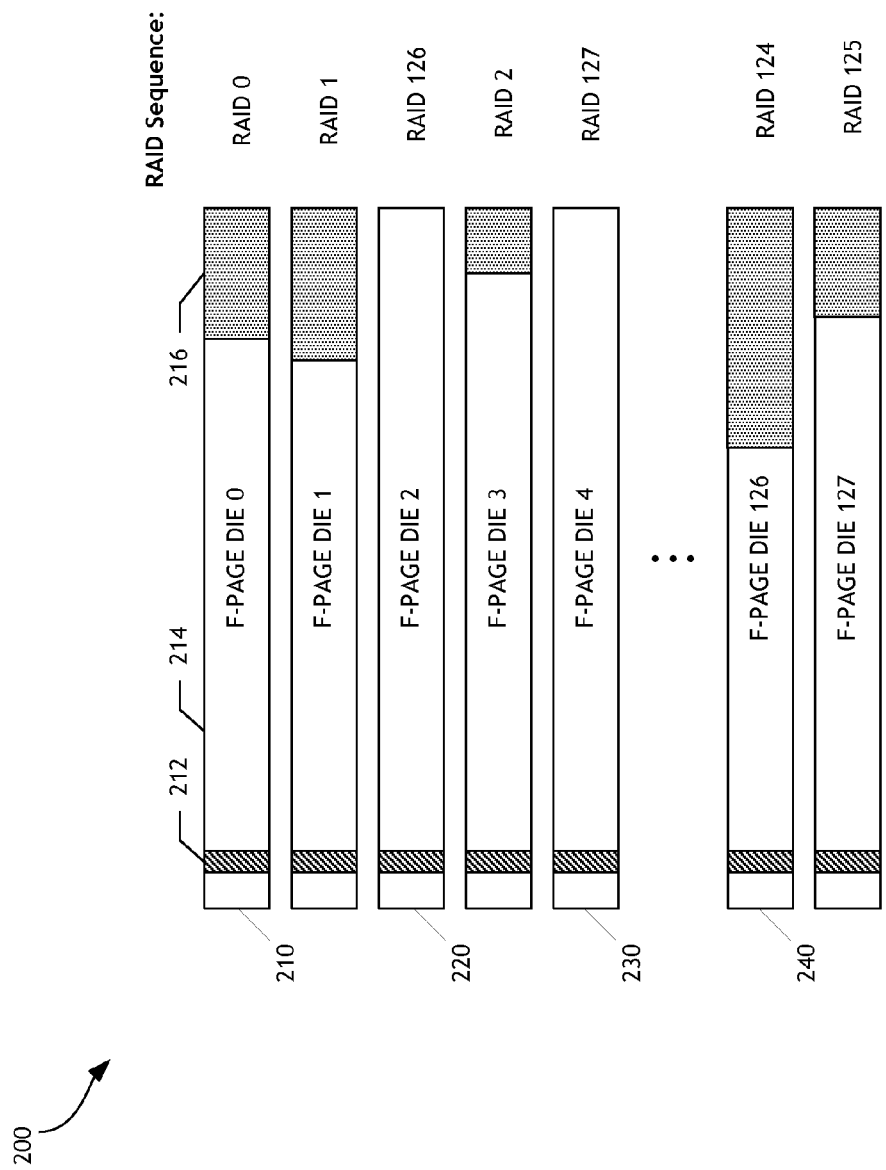
FIG. 2 is a diagram illustrating a super-page (S-page) including flash pages (F-pages) of multiple dies according to one embodiment of the invention.

FIG. 2 is a diagram illustrating a super-page (S-page) 200 including F-pages from multiple NVM array dies according to one embodiment of the invention. The S-page 200 can advantageously provide a RAID scheme for supporting inter page parity and storing data across F-pages of multiple dies. In some embodiments in which one or more dies include multiple planes (e.g., dual-plane dies), the F-pages may be spread across the multiple planes of those dies as well.

In one embodiment, the S-page 200 includes one F-page from each of 128 NVM array dies identified as Die 0 through Die 127. Each die corresponds to a die of memory and includes multiple blocks (not shown) of storage, and each block further includes multiple F-pages. The S-page 200 can comprise F-pages selected from one or more dies and/or blocks within one or more dies. In one embodiment, this selection can be performed based on a physical location of F-pages of dies or a selection stored in firmware. Further, each F-page includes multiple codeword stripes, such as codeword stripe 212, for managing a RAID sequence of the F-pages of the S-page 200.

Although dies of a non-volatile memory array may have the same physical size, some dies can have a different memory quality (e.g., reliability) for storing data than other dies. For instance, particular dies may be better suited to store data without read or write errors than other dies due to differences in a memory manufacturing process and/or wear due to use. As a result, F-pages of different dies can advantageously store different amounts of user and parity data depending on the quality of the dies which the F-pages are part of.

Although not shown in FIG. 2, each F-Page can be protected by a default minimum amount of intra page parity data. When a die is deemed to have a high quality, little or no additional intra page parity data beyond that default minimum amount may be used to protect data stored on the F-Pages on that die. However, in other dies with less than optimal quality, their F-Pages may use some additional amount of intra page parity data. In the example shown in FIG. 2, each of the F-Pages is illustrated to have a plain portion 214, and for some F-Pages, an additional dotted portion 216. The dotted portion 216 can denote the portion used to store that additional intra page parity data beyond the default minimum.

In some embodiments, one or more dies having a highest quality for storing data can be selected to store inter F-page parity data for the S-page 200 while other F-pages can be used to store user data. For example, F-page 220 of Die 2 and F-page 230 of Die 4 have been determined to have the highest quality of the 128 F-pages of the S-page 200. As such, they do not need to have any additional intra page parity data beyond the default minimum (hence they have no dotted portions 216). In one embodiment, because they can accommodate the highest amount of data as compared to the other F-pages, the F-pages 220 and 230 are used to store inter page parity data (e.g., RAID parity data). The other F-pages, such as F-pages 210 and 240, as they have less storage area due to having additional intra page parity data, are used to store user data. In some embodiments, any suitable method for determining and tracking the quality of dies and pages can be used. For example, number of data errors can be tracked for dies and/or pages of dies. As another example, a wear level indicator for blocks of a die can be determined, tracked, and used for indicating the quality. As yet another example, number of data errors, wear level indicators, and one or more other indicators of memory quality can be combined into a single metric.

Coders used for determining inter F-page parity data may support F-pages having a set amount of data. To enable such coders to support the multiple F-page sizes of the S-page 200, data from F-pages may be padded with padding data up to a maximum F-page size before coding by the coder. For instance, a coder can support F-pages having the same number of octets of data as the F-pages 220 and 230 since the F-pages 220 and 230 may have the same maximum F-page size of the F-pages of the S-page 200. The other F-pages of the S-page 200, such as F-pages 210 and 240, can then be padded with padding data 216 to include the same number of octets of data as the F-pages 220 and 230. The padding data 216 can include a data set of entirely zeros, entirely ones, etc., or any known or pre-defined data pattern. It can be noted that the padding data 216 can be characterized as "virtual padding" since the padding data itself may not be written to the F-pages with user data. In addition, the padding data may not be used to generate the intra page parity data.

Figure 3:
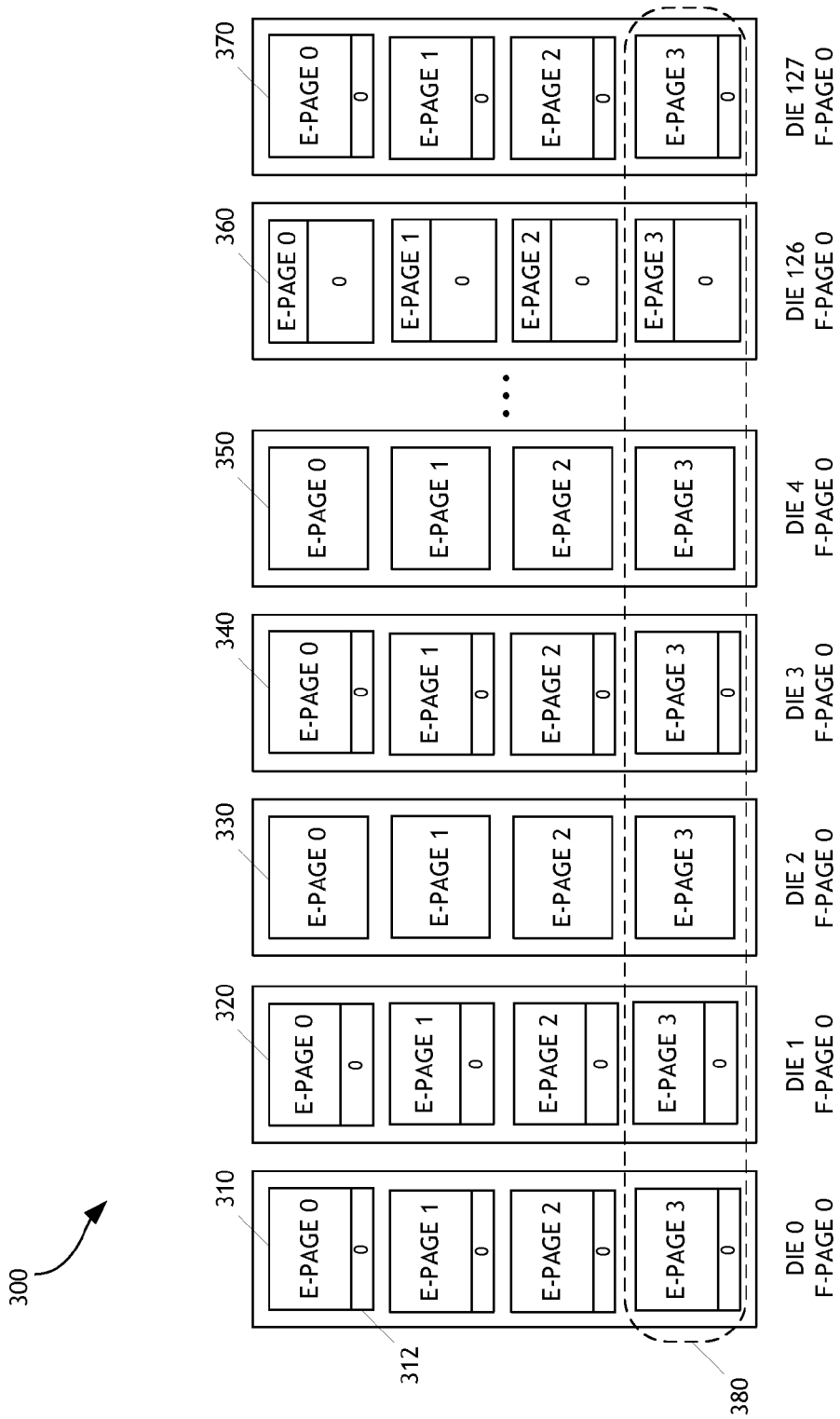
FIG. 3 is a diagram illustrating an S-page including F-pages of multiple dies according to another embodiment of the invention.

FIG. 3 is a diagram illustrating an S-page 300 including F-pages of multiple dies according to another embodiment of the invention. The S-page 300 of FIG. 3 is similar to the S-page 200 of FIG. 2 except that the illustrated padding data, such as padding data 312, is allocated to individual E-pages of F-pages. Advantageously, in some embodiments, because the padding data is allocated to individual E-pages, RAID recovery across F-pages can be performed on an E-page level without using all data from the F-pages of the S-page 300. Thereby, the amount of time to process each F-page and perform an inter F-page parity recovery for an E-page may be reduced for certain cases where there is one or two E-page errors. Also, a uniform buffer can be used regardless of the number of E-pages in an F-page since the buffer can be configured to process one set of E-pages at a time.

The S-page 300 includes one F-page from each of 128 dies identified as Die 0 through Die 127. Each die corresponds to a die of memory and includes multiple blocks (not shown) of storage, and each block further includes multiple F-pages. Each F-page of the S-page 300 includes four E-pages although, in other embodiments, the F-pages may include greater or fewer than four E-pages. In some embodiments, E-pages of a die can have the same size as other E-pages of the same die, but sizes of E-pages may differ from one die to another based on the memory quality of the dies. Each E-page may be protected by intra page parity data (not shown), such as LDPC-based parity data. The intra page parity data may be stored at the end of each E-Page or at the end of each F-Page. Again, as with FIG. 2, FIG. 3 does not show the intra page parity data. The intra page parity data for one E-page, such as E-page 310, can be determined based on the data of the E-page, excluding the padding data, such as padding data 312. By extension, the intra page parity data for an F-page may be determined based on the data of all the E-pages within that F-page, excluding any padding data. In this manner, the E-pages are aligned by E-page stripes, such as E-page stripe 380 shown in FIG. 3. In one embodiment, an E-page stripe comprises multiple codeword stripes (previously shown in FIG. 2).

The E-pages of the S-page 300 are illustrated with corresponding padding data, such as the padding data 312. The padding data includes data sets of entirely zeros in the example of FIG. 3. The amount of padding data for each E-page depends in part on an amount of user data capacity of each E-page based on the quality of the E-page. The amount of padding data can further be selected so that the total user data capacity of the E-page plus the corresponding padding data matches the size of one or more of the E-pages 330 and 350, which are used to store inter F-page parity data.

The user data and corresponding padding data of the E-pages of the S-page 300 can be used to determine corresponding inter F-page parity data for storage to E-pages of Dies 2 and 4. For example, the user data and corresponding padding data of each E-page 0, excluding the E-pages 330 and 350, can be processed by a coder and used to determine corresponding parity data for storage in the E-pages 330 and 350. If an uncorrectable error is detected during a read of an E-page of the S-page 300, corresponding E-pages of the S-page 300 can then be used to attempt to recover the data. For example, if a read of E-page 360 encounters an error that is not correctable by using its accompanying intra page parity data, then the corresponding E-Pages 310, 320, 330, etc. across the S-page (including the E-Pages with inter page parity data) may be used to recover the data in E-page 360, per a RAID data recovery operation.

Data Reliability Schemes

Figure 4:
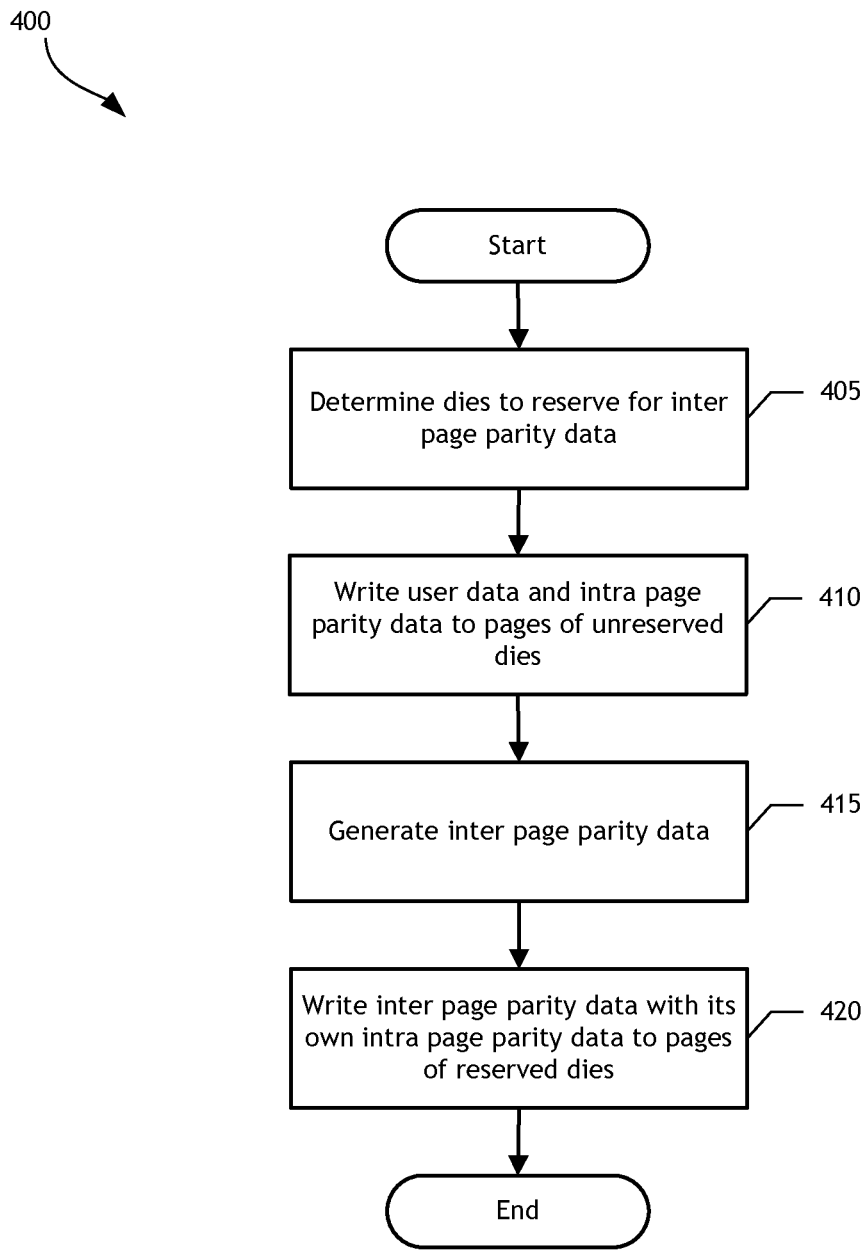
FIG. 4 is a flow diagram illustrating a process of implementing a data reliability scheme according to one embodiment of the invention.

FIG. 4 is a flow diagram illustrating a process 400 of implementing a data reliability scheme according to one embodiment of the invention. The process 400 advantageously includes both an intra and inter page parity data reliability scheme. In some embodiments, the controller 130 and/or error correction module 132 of FIG. 1 is configured to perform the process 400.

At block 405, the process 400 determines dies to reserve for inter page parity data. One or more dies having a highest quality for storing data can be reserved, for instance, based on quality metrics provided by a manufacturer and/or memory quality information determined by the controller 130 of dies of a non-volatile memory. The number of dies reserved for inter page parity data can correspond to a number of pages with errors that can be corrected using inter page parity data. For instance, in the example of FIG. 2, since one F-page of each of Dies 2 and 4 are reserved for inter F-page parity data, up to two page errors can be corrected for the S-page 200. The remaining unreserved die F-pages can be used for storage of user data.

At block 410, the process 400 writes user data and intra page parity data to F-pages of unreserved dies. For example, in the example of FIG. 3, user data and corresponding low-density parity-check (LDPC) data can be written to E-pages of the F-pages of the unreserved dies, which include all dies except Dies 2 and 4. In some embodiments, one or more suitable ECC schemes can be used for generating intra page parity data. In some embodiments, the total number of octets of the user data plus corresponding intra page parity data can be the same for each E-page so that a coder may support one processing unit size with multiple different code rates (e.g., amounts of parity data per user data). The user data and intra page parity data can be written to the pages of the reserved dies in the order of the data in some embodiments or out of order in other embodiments.

At block 415, the written user data can be padded with padding data as described above, and the process 400 generates inter page parity data using the padded user data. After the inter page parity data is generated, at block 420, the process 400 writes inter page parity data with its own intra page parity data to pages of the reserved dies. The inter page parity data can correspond to parity for F-pages as discussed with respect to FIG. 2 or parity for E-pages of F-pages as discussed with respect to FIG. 3. For instance, in the example of FIG. 3, inter F-page Reed-Solomon (RS) parity data and corresponding intra F-page LDPC data can be written to the E-pages of the reserved Dies 2 and 4. In some embodiments, one or more suitable ECC schemes can be used for generating inter page parity.

Data Recovery Schemes

Figure 5:
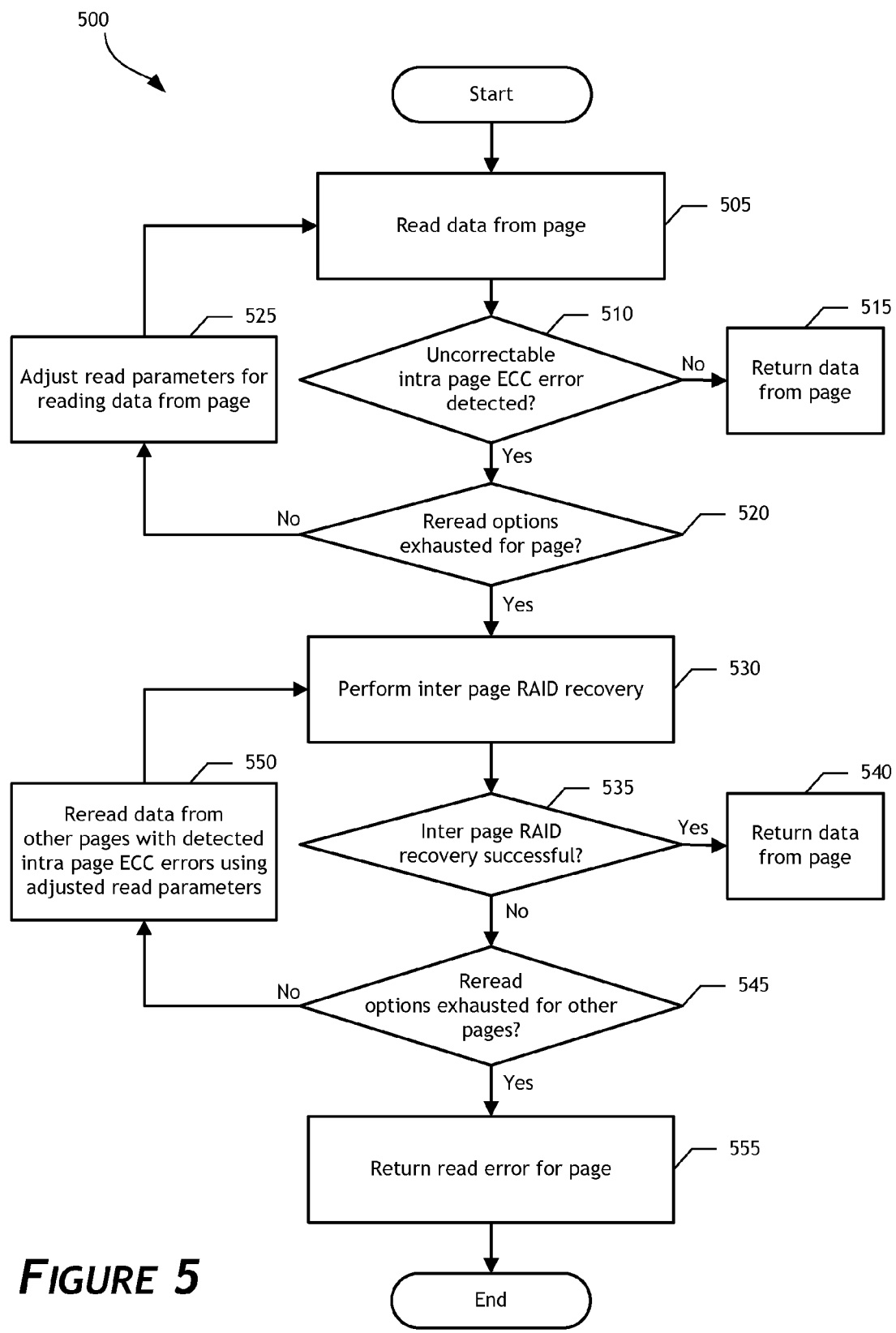
FIG. 5 is a flow diagram illustrating a process of data retrieval and recovery according to one embodiment of the invention.

FIG. 5 is a flow diagram illustrating a process 500 of data retrieval and recovery according to one embodiment of the invention. Advantageously, the process 500 provides multiple opportunities for attempting to recover data after encountering an uncorrectable error, such as an uncorrectable read data error. In addition, recovery of the data can be performed without using all data units from each page, thereby reducing an amount of time needed to process each page and perform the recovery. In some embodiments, the controller 130 and/or error correction module 132 of FIG. 1 is configured to perform the process 500.

At block 505, the process 500 reads data from a page of memory. For example, the process 500 can perform a read of E-page 310 in response to a read command from the host system 110.

At block 510, the process 500 determines whether an uncorrectable intra page ECC error is detected during the page read. If an uncorrectable error is not detected, the process 500 moves to block 515. At block 515, the process 500 returns the data from the page.

On the other hand, if an uncorrectable error is detected, the process 500 moves to block 520. At block 520, the process 500 determines whether reread options are exhausted for attempting to read the page to retrieve the stored data. For example, the process 500 can determine whether one or more single-reads or multiple-reads of the page have been performed or whether one or more reads of the page using different voltage threshold levels have been performed. If the process 500 determines that the reread options are not exhausted for attempting to read the page, the process 500 moves to block 525. At block 525, the process 500 adjusts the read parameters for reading data from the page. The process 500 then returns to block 505, and the data is read from the page using the adjusted read parameters.

If the process 500 determines that the reread options are exhausted for attempting to read the page, the process 500 instead moves to block 530. At block 530, the process 500 performs inter page RAID recovery. The inter page RAID recovery can include decoding user data and inter page parity data from corresponding pages to attempt to recover the stored data for the page. For example, if an uncorrectable intra page ECC error is detected during the page read of E-page 310 of FIG. 3, the process 500 can read data from each E-page 0 of Dies 0 through 127 of the S-page 300, and a decoder can then be used to attempt to recover the data stored in the page using all of the read E-pages. In some embodiments, the pages can be read at block 530 in an order corresponding to the order in which user data is written to an S-page. In other embodiments, the pages can be read out of order relative to the order in which user data is written to an S-page.

At block 535, the process 500 determines whether the inter page RAID recovery is successful. The inter page RAID can be deemed successful if, for instance, the recovery for the page resulted in successfully determining data contents of the page. If the inter page RAID recovery is successful, the process 500 moves to block 540, and the process 500 returns the data from the page.

On the other hand, if the inter page RAID recovery is not successful, the process 500 moves to block 545. For example, using the example in FIGS. 2 and 3, there may be instances when more than two pages have uncorrectable ECC errors, which exceeds the correction capacity of the RAID recovery in which two pages of inter page parity are used. For instance, there may be a total of three pages with uncorrectable intra page ECC errors: a page "A" that triggers the process 500 and two other pages "B" and "C" that are read as part of the RAID recovery mechanism in block 530. Note that, in the examples in FIGS. 2 and 3, the typical RAID recovery process may involve reading 128 E-pages across the S-Page.

At block 545, the process 500 determines whether reread options are exhausted for attempting to read other pages (e.g., pages "B" and "C") to retrieve the stored data in the page. For example, for one or more other pages having detected uncorrectable intra page ECC errors (e.g., page "A"), the process 500 can determine whether one or more single-reads or multiple-reads of the other pages have been performed or whether reads of the other pages (e.g., pages "B" and "C") using different voltage threshold levels have been performed. If the process 500 determines that reread options are not exhausted for attempting to read other pages to retrieve the stored data in the page, the process moves to block 550.

At block 550, the process 500 rereads data from other pages (e.g., pages "B" and "C") with detected intra page ECC errors using adjusted read parameters, such as by rereading the other pages using a single-read or multiple-read or an adjusted voltage threshold. As one example, if a detected uncorrectable intra page ECC error is triggered by the page read of E-page 310 of the S-page 300 and other uncorrectable intra page ECC errors are detected during page reads of E-pages 320 and 360 while attempting an inter page RAID recovery, the process 500 can reread data from E-page 320 or 360 to attempt to recover data stored in E-page 320 or 360, respectively. The process 500 then returns to block 530, and the process 500 performs inter page RAID recovery. If the reread of data from the other pages with detected intra page ECC errors (e.g., pages "B" and "C") results in a successful recovery of data for one or more of the other pages such that the total number of uncorrectable pages is below the RAID recovery limit (i.e., the number inter parity pages used), the inter page RAID recovery at block 530 may now be successfully performed. For instance, continuing the example of this paragraph, if the reread of E-page 320 results in a successful data recovery, the inter page RAID recovery at block 530 may now be successful since two parity pages can be used to correct the two detected intra page ECC errors of the E-pages 310 and 360. This is because the location(s) of the error(s) are known in this example implementation of RAID.

On the other hand, if the process 500 determines that reread options are exhausted for attempting to read other pages to retrieve the stored data in the page, the process 500 moves to block 555, where the process 500 returns a read error for the page.

Figure 6:
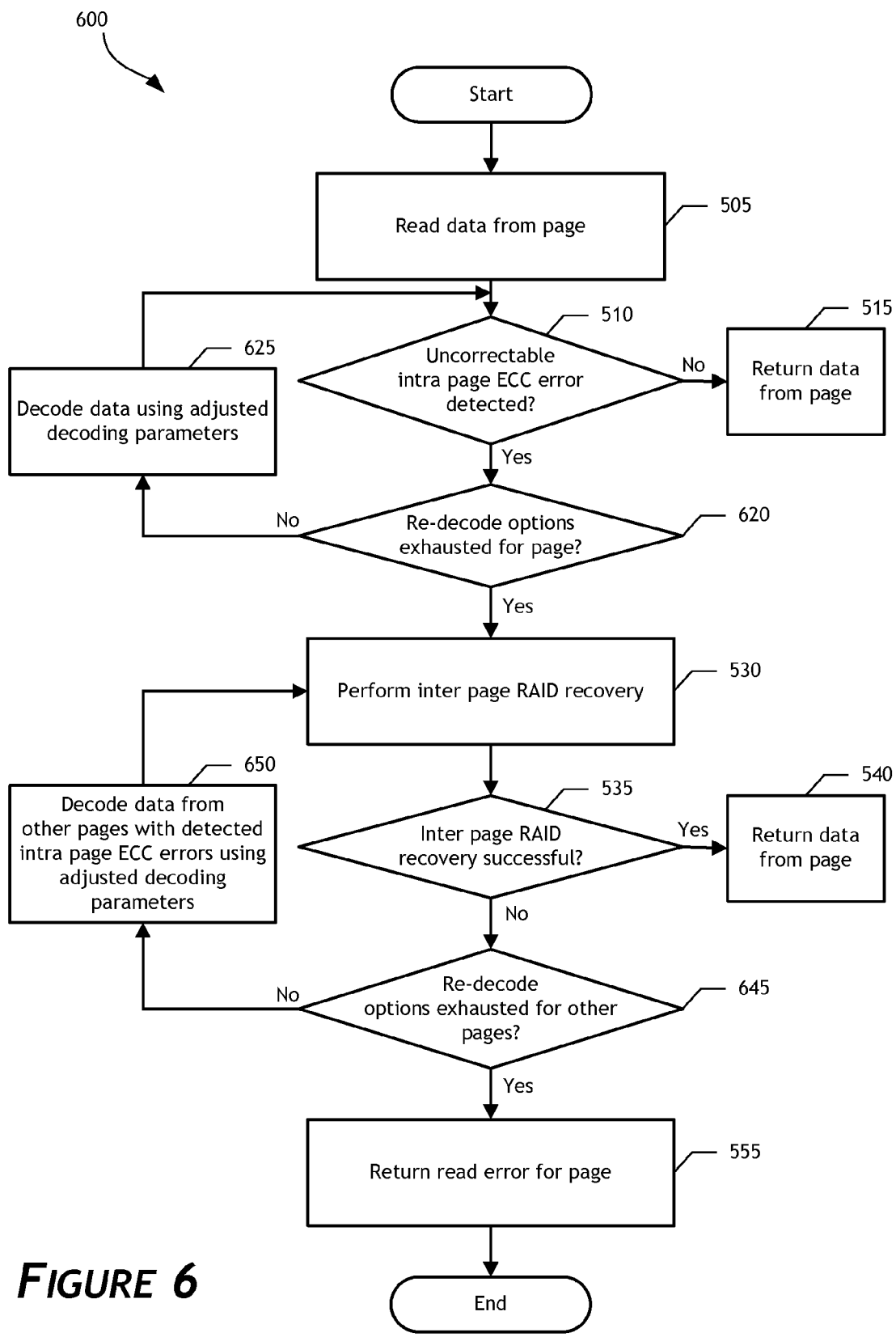
FIG. 6 is a flow diagram illustrating a process of data retrieval and recovery according to another embodiment of the invention.

FIG. 6 is a flow diagram illustrating another process 600 of data retrieval and recovery according to one embodiment of the invention. The process 600 is generally the same as the process 500 of FIG. 5 except for the substitution of blocks 520, 525, 545, and 550 with blocks 620, 625, 645, and 650. Although the processes 500 and 600 are illustrated as separate approaches, the rereading portions of process 500 and the re-decoding portions of process 600 are options that can both be attempted or used at certain times and not other times according to system conditions. For instance, when a memory array is substantially new, either rereading or re-decoding may be performed; however, as a quality of memory diminishes due to wear, both rereading and re-decoding may be performed. In some embodiments, the controller 130 and/or error correction module 132 of FIG. 1 is configured to perform the process 600.

At block 620, the process 600 determines whether re-decode options are exhausted for attempting to determine the stored data for the page. For example, the process 600 can determine whether the data from the page has already been decoded using one or more different decoding parameters. If the process 600 determines that re-decode options are not exhausted for attempting to determine the stored data, the process 600 moves to block 625. At block 625, the process 600 decodes the data from the page using adjusted decoding parameters. The process 600 then returns to block 510, and the process 500 determines whether an uncorrectable intra page ECC error is detected when decoding the data from the page.

At block 645, the process 600 determines whether re-decode options are exhausted for attempting to decode other pages (e.g., pages "B" and "C" of the example of FIG. 5 where there may be a total of three pages with uncorrectable intra page ECC errors: a page "A" that triggers the process 600 and two other pages "B" and "C" that are read as part of the RAID recovery mechanism in block 530) to determine the stored data in the page. For example, for one or more other pages having detected uncorrectable intra page ECC errors (e.g., page "A"), the process 600 can determine whether data from the other pages (e.g., pages "B" and "C") has already been decoded using one or more different decoding parameters. If the process 600 determines that re-decode options are not exhausted for attempting to decode other pages, the process moves to block 650.

At block 650, the process 600 decodes data from other pages (e.g., pages "B" and "C") with detected intra page ECC errors using adjusted decoding parameters. The process 600 then returns to block 530, and the process 600 performs inter page RAID recovery. If the re-decode of data from the other pages with detected intra page ECC errors (e.g., pages "B" and "C") results in a successful recovery of data for one or more of the other pages such that the total number of uncorrectable pages is below the RAID recovery limit (i.e., the number inter parity pages used), the inter page RAID recovery at block 530 may now be successfully performed.

Other Variations

Although this disclosure uses RAID as an example, the systems and methods described herein are not limited to the RAID redundancy schemes and can be used in any data redundancy configuration that utilizes striping and/or grouping of storage elements for mirroring or error checking purposes. In addition, although RAID is an acronym for Redundant Array of Independent Disks, RAID is not limited to storage devices with physical disks and is applicable to a wide variety of storage devices including the non-volatile solid state devices described herein.

In addition, those skilled in the art will appreciate that in some embodiments, other approaches and methods can be used. For example, the coding techniques disclosed herein can apply to codes other than or in addition to Reed-Solomon and LDPC codes. For example, a multi-dimensional XOR code can be used as the inter page parity code, and other codes like turbo codes or Bose, Chaudhuri, and Hocquenghem (BCH) codes can be used as the intra page parity code. Further, although E-pages and F-pages are discussed in this disclosure, E-pages and F-pages are illustrative working units for the data redundancy scheme and included herein as examples. The data redundancy scheme and its aspects can apply to other working units where F-pages may correspond to RAID stripes and E-pages may correspond to sub-units of RAID stripes. Accordingly, the scope of the disclosure is intended to be defined only by reference to the appended claims.

While certain embodiments have been described, these embodiments have been presented by way of example only, and are not intended to limit the scope of the protection. Indeed, the novel methods and systems described herein may be embodied in a variety of other forms. Furthermore, various omissions, substitutions and changes in the form of the methods and systems described herein may be made without departing from the spirit of the protection. The accompanying claims and their equivalents are intended to cover such forms or modifications as would fall within the scope and spirit of the protection. For example, the systems and methods disclosed herein can be applied to hard disk drives, hybrid hard drives, and the like. In addition, other forms of storage (e.g., DRAM or SRAM, battery backed-up volatile DRAM or SRAM devices, EPROM, EEPROM memory, etc.) may additionally or alternatively be used. As another example, the various components illustrated in the figures may be implemented as software and/or firmware on a processor, ASIC/FPGA, or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A data storage system, comprising:
a non-volatile memory array comprising a plurality of data pages; and
a controller configured to:
store a plurality of data units and intra page parity units in each data page of a first set of data pages of the plurality of data pages and a plurality of inter page parity units in each data page of a second set of data pages of the plurality of data pages;
in response to detecting an error using the intra page parity units of a first data page of the first set when a first data unit is read from the first data page, perform a recovery for data of the first data unit using corresponding data units from the data pages of the first set and corresponding inter page parity units from the data pages of the second set; and
in response to determining that the recovery did not result in successfully determining the data of the first data unit because a number of data pages from the first set for which data read errors are detected exceeds an error correction capability for inter data page error correction:
read one or more data units of the first set other than the first data unit using a modified read parameter or decode the one or more data units of the first set other than the first data unit using a modified decoding parameter, and
in response to determining that the number of data pages from the first set for which the data read errors are detected no longer exceeds the error correction capability for inter data page error correction, successfully determine the data of the first data unit using the corresponding data units from the data pages of the first set and the corresponding inter page parity units from the data pages of the second set,
wherein the controller is configured to perform the recovery without using all data units from the data pages of the first set and all inter page parity units from the data pages of the second set.

2. The data storage system of claim 1, wherein each data unit of the first set comprises a common number of octets of data after padding with a pre-defined data set, and each inter page parity unit of the second set comprises the common number of octets of data and corresponds to a parity based at least in part on the corresponding data units from the data pages of the first set.

3. The data storage system of claim 1, wherein each data page of the plurality of data pages comprises a flash page (F-page), and each data unit comprises an error-correcting code page (E-page).

4. The data storage system of claim 3, wherein the first set and the second set together form a super-page (S-page) comprising one F-page from each array die of a plurality of array dies.

5. The data storage system of claim 1, wherein the plurality of intra page parity units comprise low-density parity-check (LDPC) parity units, and the plurality of inter page parity units comprise Reed-Solomon (RS) parity units.

6. The data storage system of claim 1, wherein the controller is further configured to read the first data unit using the modified read parameter in response to detecting the error using the intra page parity units of the first data page when the first data unit is read from the first data page.

7. The data storage system of claim 6, wherein the modified read parameter comprises at least one of: a single-read/multiple-read and a voltage threshold adjustment.

8. The solid-state storage system of claim 1, wherein the controller is configured to read the one or more data units of the first set other than the first data unit using the modified read parameter in response to determining that the recovery did not result in successfully determining the data of the first data unit.

9. The data storage system of claim 1, wherein the controller is further configured to decode the first data unit using the modified decoding parameter in response to detecting the error using the intra page parity units of the first data page when the first data unit is read from the first data page.

10. The data storage system of claim 1, wherein the controller is configured to decode the one or more data units of the first set other than the first data unit using the modified decoding parameter in response to determining that the recovery did not result in successfully determining the data of the first data unit.

11. The data storage system of claim 1, wherein the controller is further configured to:
assign individual data pages of the plurality of data pages to either the first set or the second set based on quality data about the individual data pages, and
determine each inter page parity unit of the second set based at least in part on the corresponding data units from the data pages of the first set.

12. In a data storage system comprising a controller and a non-volatile memory array including a plurality of data pages, a method of performing data recovery, the method comprising:
storing a plurality of data units and intra page parity units in each data page of a first set of data pages of the plurality of data pages and a plurality of inter page parity units in each data page of a second set of data pages of the plurality of data pages;
in response to detecting an error using the intra page parity units of a first data page of the first set when a first data unit is read from the first data page, performing a recovery for data of the first data unit using corresponding data units from the data pages of the first set and a-corresponding inter page parity units from the data pages of the second set; and
in response to determining that the recovery did not result in successfully determining the data of the first data unit because a number of data pages from the first set for which data read errors are detected exceeds an error correction capability for inter data page error correction:
reading one or more data units of the first set other than the first data unit using a modified read parameter or decoding the one or more data units of the first set other than the first data unit using a modified decoding parameter, and in response to determining that the number of data pages from the first set for which the data read errors are detected no longer exceeds the error correction capability for inter data page error correction, successfully determining the data of the first data unit using the corresponding data units from the data pages of the first set and the corresponding inter page parity units from the data pages of the second set,
wherein the recovery is performed using less than all of the data units from the data pages of the first set and less than all inter page parity units from the data pages of the second set.

13. The method of claim 12, wherein each data unit of the first set comprises a common number of octets of data after padding with a pre-defined data set, and each inter page parity unit of the second set comprises the common number of octets of data and corresponds to a parity based at least in part on the corresponding data units from the data pages of the first set.

14. The method of claim 12, wherein each data page of the plurality of data pages comprises a flash page (F-page), and each data unit comprises an error-correcting code page (E-page).

15. The method of claim 14, wherein the first set and the second set together form a super-page (S-page) comprising one F-page from each array die of a plurality of array dies.

16. The method of claim 12, wherein plurality of the intra page parity units comprise low-density parity-check (LDPC) parity units, and plurality of the inter page parity units comprise Reed-Solomon (RS) parity units.

17. The method of claim 12, further comprising reading the first data unit using the modified read parameter in response to detecting the error using the intra page parity units of the first data page when the first data unit is read from the first data page.

18. The method of claim 17, wherein the modified read parameter comprises at least one of: a single-read/multiple-read and a voltage threshold adjustment.

19. The method of claim 12, further comprising reading the one or more data units of the first set other than the first data unit using the modified read parameter in response to determining that the recovery did not result in successfully determining the data of the first data unit.

20. The method of claim 12, further comprising decoding the first data unit using the modified decoding parameter in response to detecting the error using the intra page parity units of the first data page when the first data unit is read from the first data page.

21. The method of claim 12, further comprising decoding the one or more data units of the first set other than the first data unit using the modified decoding parameter in response to determining that the recovery did not result in successfully determining the data of the first data unit.

22. The method of claim 12, further comprising:
assigning individual data pages of the plurality of data pages to either the first set or the second set based on quality data about the individual data pages, and
determining each inter page parity unit of the second set based at least in part on the corresponding data units from the data pages of the first set.

* * * * *